(12) United States Patent
Danneberg

(10) Patent No.: US 6,361,165 B1
(45) Date of Patent: Mar. 26, 2002

(54) FLYGLASSES

(75) Inventor: Holger Danneberg, Suhlendorf (DE)

(73) Assignee: Werkhaus Design + Produktion GmbH, Suhlendorf (DE)

( * ) Notice: Subject to any disclaimer, the term of this patent is extended or adjusted under 35 U.S.C. 154(b) by 0 days.

(21) Appl. No.: 09/501,312

(22) Filed: Feb. 10, 2000

(30) Foreign Application Priority Data

Feb. 11, 1999 (DE) ........................ 299 02 409 U

(51) Int. Cl.[7] .............. G02C 3/04; G02B 7/02
(52) U.S. Cl. .............. 351/56; 351/158; 351/161; 351/170; 351/171; 351/175; 359/812; 359/894; 359/482
(58) Field of Search .............. 359/812, 482, 359/819, 831, 894, 720; 351/56, 158, 170, 171, 175, 161

(56) References Cited

U.S. PATENT DOCUMENTS

| | | | | |
|---|---|---|---|---|
| 2,736,232 A | * | 2/1956 | Brusell | 351/171 |
| 2,736,233 A | * | 2/1956 | Brusell | 351/171 |
| 3,549,302 A | * | 12/1970 | Fraige | 351/175 |
| 4,353,621 A | | 10/1982 | Geer et al. | 359/482 |
| 4,960,326 A | * | 10/1990 | Dauvergne | 351/175 |
| 5,017,000 A | * | 5/1991 | Cohen | 351/161 |
| 5,155,508 A | * | 10/1992 | Onufryk | 351/158 |
| 5,323,190 A | * | 6/1994 | Onufryk | 351/158 |

FOREIGN PATENT DOCUMENTS

| | | |
|---|---|---|
| EP | 0 886 150 | 12/1998 |
| WO | WO 81/03119 | 11/1981 |

* cited by examiner

*Primary Examiner*—Loha Ben
(74) *Attorney, Agent, or Firm*—Nixon Peabody LLP; David S. Safran

(57) ABSTRACT

Flyglasses having two lenses, at least one of which is faceted and both of which are held in a mount that is preferably flat. The mount can be in the form of a so-called lorgnette having a handle made in the form of a small board which is especially suited for application of decorative patterns or advertizing or it can be in the form of conventional eyeglass frames or goggles.

7 Claims, 1 Drawing Sheet

FLYGLASSES

BACKGROUND OF THE INVENTION

1. Field of the Invention

The invention is directed to optical toys, and in particular, faceted kaleidoscopic viewing glasses.

2. Description of Related Art

Optical kaleidoscopic toys and viewers have been known for a long time and in various forms; see, U.S. Pat. Nos. 5,087,991 and 781,485. However, these devices have been monovision devices having a single eyepiece.

SUMMARY OF THE INVENTION

The invention relates to a new toy which is hereafter called "flyglasses."

The new flyglasses have two facetted lenses, preferably in a flat mount, One preferred embodiment of the flyglasses of the invention is in the form of a so-called lorgnette having a stem made in the form of a small board which is especially suited for application of decorative patterns or advertising. Another embodiment has conventional glasses frames or a peripheral rubber belt (goggles) in which the facetted lenses are located. The lens glass is, like the eye of a fly, divided into a host of facets which each individually reproduce the viewed object when looked through, so that to the viewer the object is represented in the number of segments of a corresponding multiple reproduction.

Further features of the invention are described in detail below with reference to the accompanying drawings.

DETAILED DESCRIPTION OF THE INVENTION

Figure 1:
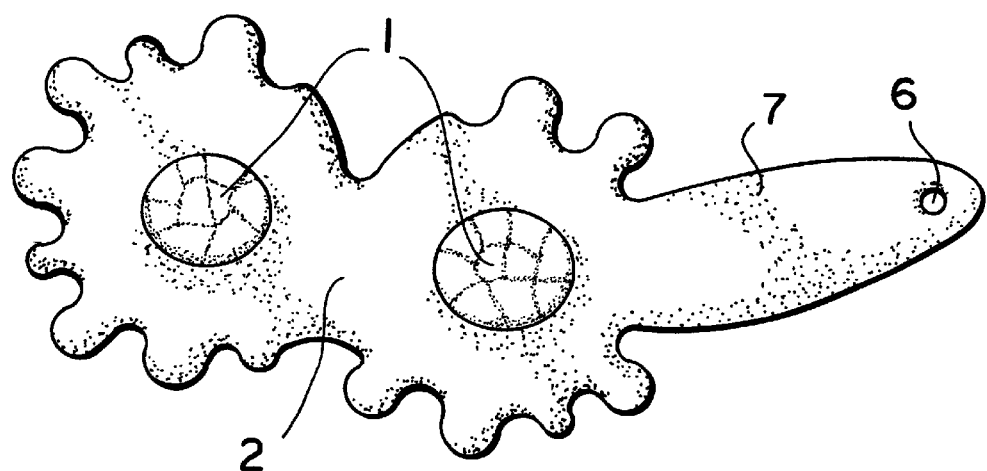
FIG. 1 shows one aspect of a flat embodiment of the flyglasses in accordance with the invention in the form of a lorgnette.

As shown in FIG. 1, the flyglasses in accordance with the invention have two lenses 1 which are divided into facets, preferably faceted kaleidoscope lenses being used.

The lenses 1 are inserted in a flat mount 2 with an octagonal outline. The flat mount preferably has a thickness from roughly 1 to 5 mm and an area which is roughly 2 to 6 times that of the lens area. Here, a lens diameter of roughly 3 cm is assumed; the lens distance corresponds to the average eye distance.

The preferred lorgnette execution as shown in FIG. 1 has a board-shaped handle 7 which has a hole or all eye 6 through which a neck band or a neck chain is guided for hanging the flyglasses. If desired, the handle 7 can serve as an advertizing surface.

Figure 2:
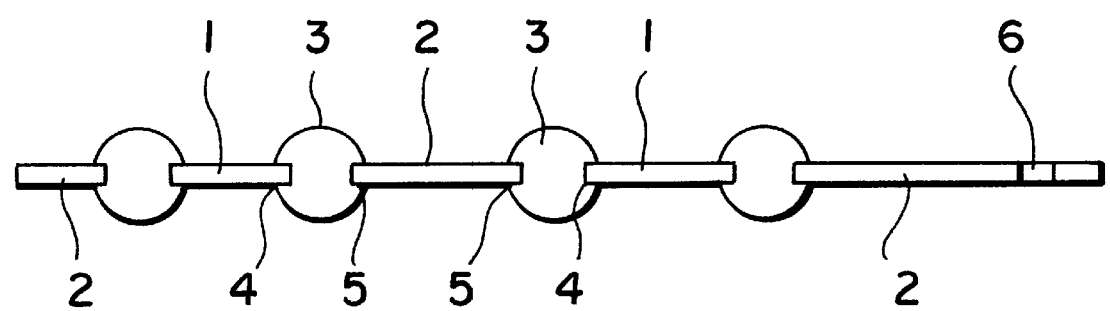
FIG. 2 is a partial cross section through the lenses of the flyglasses of FIG. 1.

The lenses 1 are fixed in the mount 2 in the corresponding recesses by cementing, pressing in or (when made of plastic) by welding in; preferably, they are fixed in an inner groove 4 of a peripheral elastic ring 3 of rubber or plastic, as shown in FIG. 2, while the peripheral edge of the recess in the mount 2 is supported in an externally peripheral groove 5 of the elastic ring 3.

In this way, it is possible to make the flyglasses a simple kit for assembly by small children.

Depending on the embodiment of the lens glass, the individual facets can be made larger or smaller in the same way or can reproduce the object not enlarged or not reduced; in one special embodiment the individual facets, however, can also be made to differ from one another so that a ring of facets is enlarged when looked through, while the remaining facets can be made smaller or vice versa or mixed. It is also conceivable to use differently faceted Incises or one faceted lens with one conventional lens in the glasses.

In the embodiment of the glasses with a flat mount the flat execution in almost any shape offers a suitable substrate for diverse graphic or advertizing possibilities.

While various embodiments in accordance with the present invention have been described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. Flyglasses comprising two lenses, at least one of the lenses having multiple facets and a mount in which the lenses are held;

wherein at least one lens is a conventional kaleidoscope lens;

wherein the lenses are spaced at an eye distance from one another in said mount; and wherein said mount is flat having a thickness of about 1 to 5 mm and an area which is at least twice that of the lenses.

2. Flyglasses as claimed in claim 1, further comprising two annular rubber beads, each of which has an internal peripheral groove in which is received a peripheral edge of a respective one of the lenses and an external peripheral groove mounted on an edge of a respective circular recess in the flat mount.

3. Flyglasses as claimed in claim 1, wherein carrier member is in the form of a lorgnette having a handle.

4. Flyglasses as claimed in claim 3, wherein handle is board-shaped with a length of roughly 10 cm and a width of roughly 3 cm.

5. Flyglasses according to claim 1, further comprising two annular rubber beads, each of which has an internal peripheral groove and an external peripheral groove; wherein the lenses, rubber beads, and mount are in a disassembled condition forming a kit for assembly by a user, an outer edge of the lenses being sized for mounting in the internal peripheral groove of the bead and the mounting having openings with a peripheral edge sized for reception in the outer peripheral groove of the beads.

6. Flyglasses as claimed in claim 1, wherein the area of the mount is at most six times that of the lenses.

7. Flyglasses as claimed in claim 1, wherein both of said lenses are conventional kaleidoscope lenses.

* * * * *